US010601763B2

(12) United States Patent
Wang

(10) Patent No.: US 10,601,763 B2
(45) Date of Patent: Mar. 24, 2020

(54) METHOD AND APPARATUS FOR GENERATING AND SENDING A TWO-DIMENSIONAL CODE IN A MESSAGE

(71) Applicant: Alibaba Group Holding Limited, George Town, Grand Cayman (KY)

(72) Inventor: Bicai Wang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 241 days.

(21) Appl. No.: 14/885,839

(22) Filed: Oct. 16, 2015

(65) Prior Publication Data

US 2016/0119273 A1 Apr. 28, 2016

(30) Foreign Application Priority Data

Oct. 22, 2014 (CN) .......................... 2014 1 0568408

(51) Int. Cl.
*H04L 12/58* (2006.01)
*H04L 29/08* (2006.01)

(52) U.S. Cl.
CPC .............. *H04L 51/36* (2013.01); *H04L 51/18* (2013.01); *H04L 67/04* (2013.01); *H04L 67/12* (2013.01); *H04L 67/125* (2013.01)

(58) Field of Classification Search
None
See application file for complete search history.

(56) References Cited

U.S. PATENT DOCUMENTS

| 6,766,956 B1 | 7/2004 | Boylan, III |
| 8,308,056 B2 | 11/2012 | Millan Marco |
| 8,670,976 B2 | 3/2014 | Al-Omari |

(Continued)

FOREIGN PATENT DOCUMENTS

| EP | 2782060 | 9/2014 |
| EP | 2782060 A1 | 9/2014 |

(Continued)

OTHER PUBLICATIONS

Gao et al., A 2D Barcode-Based Mobile Payment System; 320-329, Jun. 2009. (Retrieved on Feb. 10, 2016).

(Continued)

*Primary Examiner* — Younes Naji
(74) *Attorney, Agent, or Firm* — Shun Yao; Park, Vaughan, Fleming & Dowler LLP

(57) ABSTRACT

A code-generating system can be accessed from within a messaging application on a mobile computing device to generate and insert a two-dimensional (2-D) code into a message. During operation, the system can receive a request to generate a 2-D code, such as from the messaging application executing on the mobile device or from the operating system. In response to receiving the request, the system can present a user-interface (UI) mechanism (e.g., modal window) for entering or selecting message content to convert into a 2-D code. Then, in response to obtaining the message content from a local user, the system may generate a 2-D code for the message content, and may generate a message that includes the 2-D code (e.g., by inserting the 2-D code into the message body). The system may then send the message, which includes the 2-D code, to a target recipient.

20 Claims, 6 Drawing Sheets

(56) References Cited

U.S. PATENT DOCUMENTS

| | | | |
|---|---|---|---|
| 8,725,490 | B2 | 5/2014 | Athsani |
| 8,817,959 | B1 | 8/2014 | O'Hanlon |
| 2002/0026475 | A1 | 2/2002 | Marmor |
| 2004/0078282 | A1 | 4/2004 | Robinson |
| 2004/0210841 | A1 | 10/2004 | Takahashi |
| 2005/0138124 | A1 | 6/2005 | Klassen |
| 2006/0065733 | A1 | 3/2006 | Lee |
| 2010/0159965 | A1* | 6/2010 | Pascal .................. H04L 51/066 455/466 |
| 2010/0272193 | A1* | 10/2010 | Khan .................. H04L 1/0041 375/259 |
| 2011/0270751 | A1* | 11/2011 | Csinger .................. G06F 21/40 705/42 |
| 2012/0118976 | A1 | 5/2012 | Debski |
| 2012/0271725 | A1 | 10/2012 | Cheng |
| 2013/0144674 | A1* | 6/2013 | Kim .................. G06Q 30/0207 705/7.19 |
| 2013/0282360 | A1 | 10/2013 | Shimota |
| 2014/0006198 | A1 | 1/2014 | Daly |
| 2014/0195218 | A1 | 7/2014 | Takaoka |
| 2015/0269565 | A1* | 9/2015 | Inotay .................. G06Q 20/354 235/380 |
| 2015/0358787 | A1* | 12/2015 | Huang .................. H04W 4/14 455/466 |

FOREIGN PATENT DOCUMENTS

| | | |
|---|---|---|
| GB | 2283850 | 5/1995 |
| KR | 20100053707 | 5/2010 |
| WO | 2008064909 | 6/2008 |
| WO | 2010135263 | 11/2010 |
| WO | 2010135263 A2 | 11/2010 |
| WO | 2014001937 | 1/2014 |

OTHER PUBLICATIONS

Rouillard, Contextual QR Codes; 50-55, Jul. 2008. (Retrieved on Feb. 10, 2016).

Carzaniga et al., Designing Distributed Applications with Mobile Code Paradigms; 22-32, May 1997. (Retrieved on Feb. 10, 2016).

Johnston et al., Electronic Data Interchange Using Two Dimensional Bar Code; 83-91, Jan. 1998. (Retrieved on Feb. 10, 2016).

Ibrahim et al., Steganography Algorithm to Hide Secret Message Inside an Image; 102-108,Dec. 2011. (Retreived on Feb. 10, 2016).

Gao et al., "A 2D Barcode-Based Mobile Payment System; 320-329, Jun. 2009", http://www.researchgate.net/profile/Jerry_Gao/publication/221281905_A_2D_Barcode_Based_Mobile_Payment_System/links/54iffc590cf2eaf210bcd49c.pdf, entire document.

Rouillard. "Contextual QR Codes", 50-55, Jul. 2008, http://www.lifl.fr/-rouillar/publi/2008_Rouillard_ICCGI.pdf, entire document.

Carzaniga et al., "Designing Distributed Applications with Mobile Code Paradigms", 22-32, May 1997, http://sei.pku.edu.cn/-yaoguo/PhDReading07/carzaniga-icse19.pdf, entire document.

Johnston et al., "Electronic Data Interchange Using Two Dimensional Bar Code", 83-91, Jan. 1998, http://www.computer.org/csdl/proceedings/hicss/1998/8242/04/82420083.pdf.

Ibrahim et al., "Steganography Algorithm to Hide Secret Message Inside an Image", 102-108, Dec. 2011, http://arxiv.org/pdf/1112.2809.

Anonymous, "EnvoyWorldWide Unveils Intelligent and Interactive Messaging Capabilities at DEMO 2001," Business Wire, Feb. 2001.

* cited by examiner

METHOD AND APPARATUS FOR GENERATING AND SENDING A TWO-DIMENSIONAL CODE IN A MESSAGE

RELATED APPLICATION

Under 35 U.S.C. 119, this application claims the benefit and right of priority of Chinese Patent Application No. 201410568408.9, filed 22 Oct. 2014.

BACKGROUND

Field

This disclosure is generally related to mobile communications. More specifically, this disclosure is related to generating and sending a two-dimensional code in a communication message.

Related Art

Advancements in low-power circuits, battery technologies, and cellular and wireless networks has resulted in the proliferation of various types of mobile computing systems. In many cases, consumers prefer to perform their computing tasks on laptops, tablet computers, and smartphones over traditional desktop (non-mobile) computers.

With such mobile devices, a user may communicate with others, access the Internet, or perform other online tasks anytime and anywhere. However, due to their small size and/or their portability, a user is typically only able to access one application at a time. For example, users oftentimes communicate with others while on the go using a messaging application on their mobile device. On mobile devices, such as smartphones and tablet computers, the messaging application may consume the complete display screen.

Unfortunately, existing messaging applications typically have a limited set of features, which limits the types of content that a user can share with others. If a user wishes to send other types of content to others, the user may need to switch to another application suitable for communicating such content on the mobile device, which can degrade the user experience and decrease communication efficiency.

SUMMARY

One embodiment provides a code-generating system that can generate and insert a two-dimensional (2-D) code into a message from within a messaging application on a mobile computing device. During operation, the system can receive a request to generate a 2-D code, such as from the messaging application executing on the mobile device or from the operating system. In response to receiving the request, the system can present a user-interface (UI) mechanism (e.g., modal window) for entering or selecting message content to convert into a 2-D code. Then, in response to obtaining the message content from a local user, the system may generate a 2-D code for the message content, and may generate a message that includes the 2-D code (e.g., by inserting the 2-D code into the message body). The system may then send the message, which includes the 2-D code, to a target recipient.

In some embodiments, the system can obtain, from the local user, additional message content that is not to be converted into a 2-D code. The system may generate the message by generating the message to include the 2-D code and the additional message content.

In some embodiments, the system can enter the 2-D message into an input field of the messaging application, and can allow the user to enter additional message content for the target recipient into the input field.

In some embodiments, the system can present the UI-mechanism within the messaging application.

In some embodiments, the system can present the UI mechanism as an overlay screen on top of the messaging application.

In some embodiments, the system can generate the 2-D code by processing the message content locally on the mobile device.

In some embodiments, the system can generate the 2-D code by sending the message content to a code-generating server, and receiving the 2-D code from the code-generating server.

In some embodiments, the code-generating server can send the 2-D code to a personal computing device of the target recipient.

In some embodiments, the system can send the message that includes the 2-D code to a messaging server, which makes the message available to the target recipient.

In some embodiments, the system can send the message that includes the 2-D code to a personal computing device of the target recipient.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a code-generating system that solves the problem of generating and sending a two-dimensional (2-D) code from within a messaging application on a mobile communication device. For example, users oftentimes communicate with others while on the go using a messaging application on their mobile device. However, if the user wishes to send a type of content not supported by the messaging application, the user can use the code-generating system to generate and send a 2-D code for the content from within the messaging application.

For example, some messaging applications may not support sending a video, a 3-D animation, an interactive widget, or other less-common types of content. However, most messaging applications allow a user to insert a two-dimensional image into a message body, and to send the message with the picture to others. The code-generating system can leverage this capability to send any type of content to others by allowing a user to generate a 2-D code for the content, and to insert the 2-D code into the message being composed by the user, without requiring the user to leave the messaging application. The 2-D code can include any optical label or image that can encode digital information, such as a matrix code, a two-dimensional barcode, or any machine-readable label now known or later developed.

Hence, the code-generating system can allow the user to embed the 2-D code into the message without disabling the messaging application, and without requiring the user to switch to another application altogether (e.g., to generate the 2-D code) during the process.

Exemplary Environment

Figure 1:
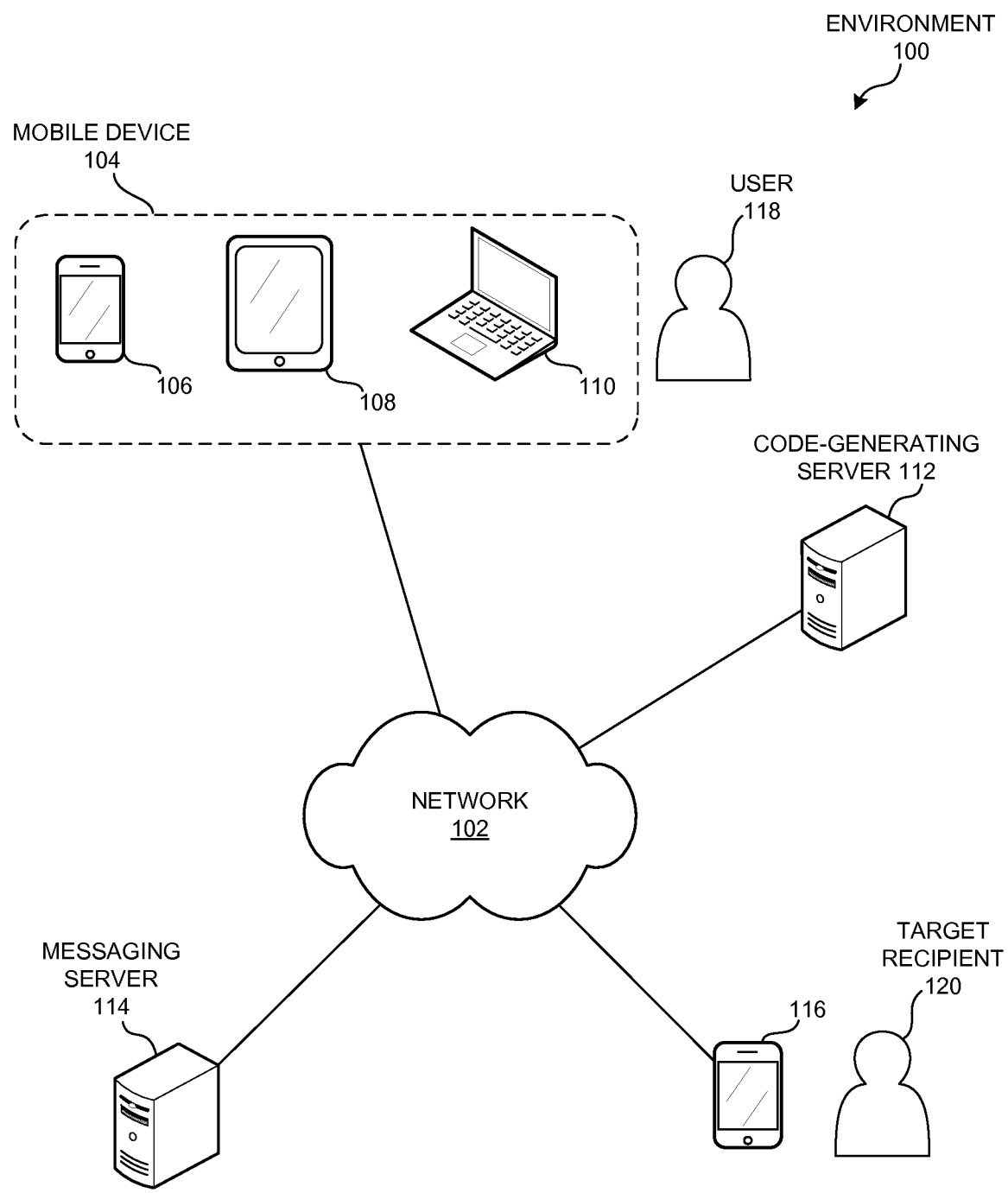
FIG. 1 illustrates an exemplary computing environment that facilitates using a messaging application to generate and send a two-dimensional code to a target recipient in accordance with an embodiment.

FIG. 1 illustrates an exemplary computing environment 100 that facilitates using a messaging application to generate and send a 2-D code to a target recipient 120 in accordance with an embodiment. A user 118 can operate the messaging application on a mobile device 104 to compose a message, and can access a code-generating mechanism of mobile device 104 while composing the message to insert a 2-D code into the message.

In some embodiments, mobile device 104 may display the code-generating mechanism as a graphical control element of the messaging application, or as an overlay (e.g., a modal window) that is displayed on top of the messaging application. This way, the user can select the message content that is to be encoded into the 2-D code, and can generate the 2-D code, without leaving the messaging application. This message content can include, but is not limited to, text, an image, a hyperlink, a video segment, a two-dimensional animation, a three-dimensional model, a three-dimensional animation, an application, etc.

In some embodiments, mobile device 104 may be any electronic or computing device that includes a network interface, and includes sensors capable of capturing location or environmental information for the device. For example, mobile device 104 can include a smartphone 106, a tablet device 108, a laptop computer 110, a smart watch (not shown), or a network-enabled automobile (not shown) that may be capable of communicating over network 102. Moreover, the messaging application can include an email client, a Short Messaging Service (SMS), an online chat (e.g., instant messaging) client, or any other application for communicating text or images with others.

Mobile device 104 may generate the 2-D code itself, or may offload the code-generating task to code-generating server 112. For example, mobile device 104 may send the code-generating request to code-generating server 112 via a network 102. Network 102 can include any network for interfacing computing devices to each other, such as a cellular network, a wireless network, or the Internet. Network 102 can include an IP-based network, or can include a wireless ad-hoc network.

In some embodiments, code-generating server 112 may generate a 2-D code that encodes the message content, or may generate a 2-D code that includes a link (e.g., a hyperlink) to the message content. For example, code-generating server 112 may store the message content locally or on any storage server, and may generate a 2-D code that encodes a link to the message content on the storage server. Target recipient 120 can access the original message content by using an application on his personal computing device 116 to decode the link from the 2-D code, and to follow the link (e.g., using a web browser, or the application that decodes the 2-D code) to download the message content.

Once code-generating server 112 generates the 2-D code, code-generating server 112 may use network 120 to send the 2-D code to mobile device 104, or to send the 2-D code directly to a mobile device 116 of target recipient 120. If code-generating server 112 returns the 2-D code to the device that sent the request (e.g., mobile device 104), mobile device 104 can insert the 2-D code into the message being composed by user 118.

Once user 118 finishes composing the message and sends the message to target recipient 120, mobile device 104 can send the message to a messaging server 114 that makes the message available to target recipient 120. Target recipient 120 may then use any computing device 116 to log into messaging server 114 (e.g., using a messaging application), at which point messaging server 114 may send the message (and any other unread messages) to computing device 116. Alternatively, if mobile device 104 and computing device 116 have a direct communication session to each other over network 102 (e.g., a peer-to-peer communication session), mobile device 104 may send the message to computing device 116 via this direct communication session.

Figure 2:
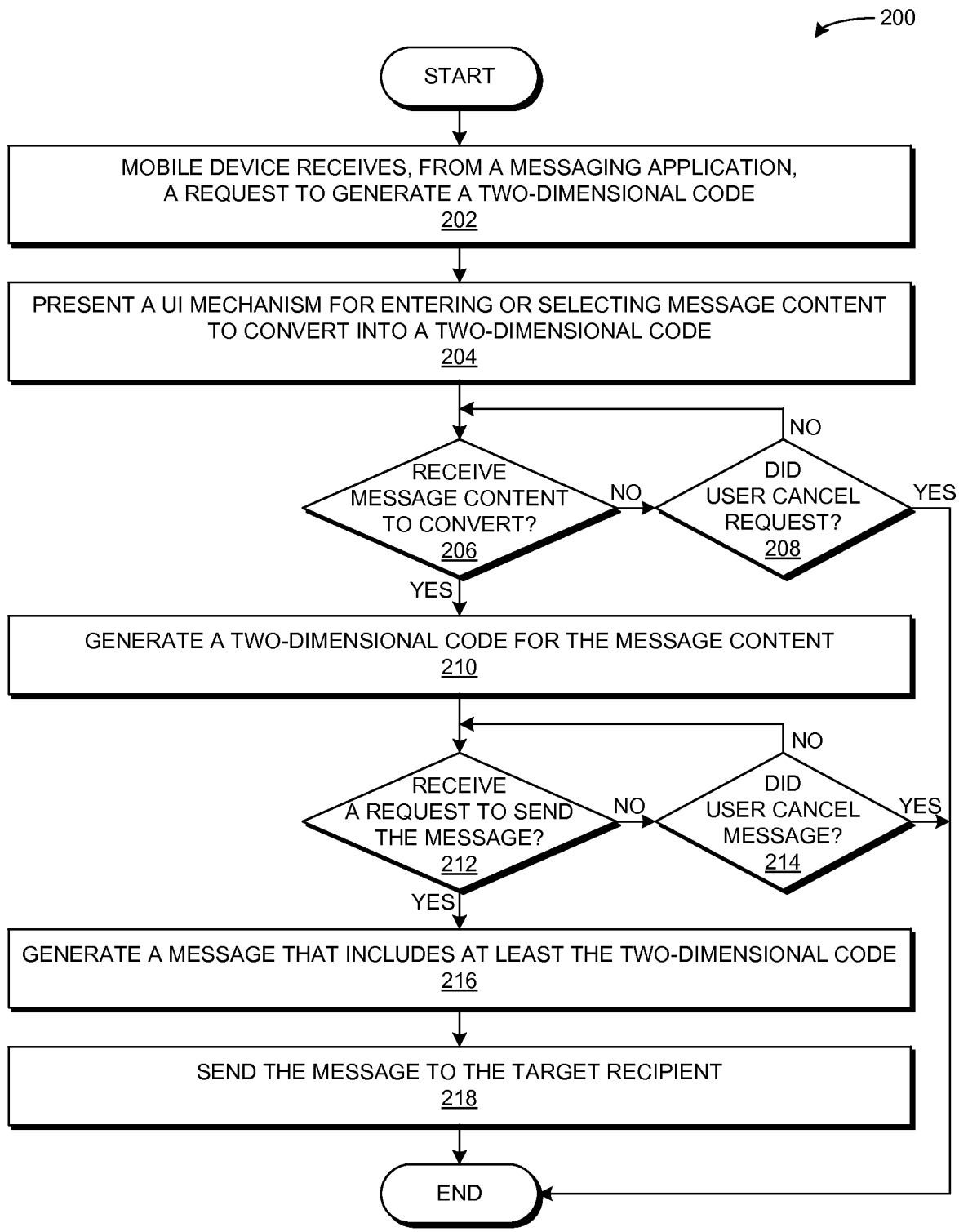
FIG. 2 presents a flow-chart illustrating a method for generating and sending a two-dimensional code from a messaging application in accordance with an embodiment.

FIG. 2 presents a flow-chart illustrating a method 200 for generating and sending a two-dimensional code from a messaging application in accordance with an embodiment. During operation, the mobile device can receive, from a messaging application, a request to generate a 2-D code (operation 202). In response to receiving the request, the mobile device can present a code-generating user interface (UI) mechanism, such as a modal window, for entering or selecting message content that is to be converted into a 2-D code. For example, a UI of the messaging application may include a button (or any other type of user-input mechanism) for generating a 2-D code. When the user selects this button, the messaging application (or an operating system of the mobile device) can display the code-generating UI mechanism.

Alternatively, the user may access another UI element provided by the operating system of the mobile device (e.g., an on-screen keyboard, or a control panel) that includes a button for accessing the code-generating UI mechanism. This UI element may be presented within the messaging application's user interface, or may be presented by the operating system as an overlay on top of the messaging application's user interface (e.g., a default on-screen keyboard).

Hence, the user may access the code-generating UI mechanism without having to hide the messaging application, switch to another application, or leave the messaging application. This can avoid requiring the user to perform additional steps that can frustrate or confuse the user, thereby enhancing the user experience while improving the communication efficiency.

In some embodiments, the code-generating UI mechanism can include an input field that allows the user to enter (e.g., by typing, or pasting) text, a hyperlink, an image, an audio or video segment, or any other content that can be converted into a 2-D code. Alternatively, the code-generating UI mechanism may include a browser window, which allows the user to browse through a filesystem, a collection of images (e.g., a virtual photo album), a set of personal contacts (e.g., a virtual contact index), or through any collection of data.

Once the mobile device presents the code-generating UI mechanism to the user, the mobile device may wait for the user to select or enter message content (operation 206). In some embodiments, the code-generating UI mechanism can include a button for disabling the code-generating mechanism (e.g., a "Cancel" button). If the code-generating UI mechanism does not receive message content from the user, the code-generating UI mechanism may determine whether the user has cancelled or otherwise disabled the code-generating UI mechanism (operation 208). If the user has not disabled the code-generating UI mechanism, the system may return to operation 206 to wait for the message content that is to be converted into a 2-D code. Otherwise, the process may end, such as to allow the user to communicate as usual (e.g., without generating 2-D codes).

On the other hand, when the mobile device receives the message content to convert (operation 206), the mobile device may proceed to generate a 2-D code for the message content (operation 210). In some embodiments, the mobile device may generate the 2-D code locally. For example, the messaging application, the operating system, or another application or hardware module (e.g., an integrated circuit) on the mobile device can generate a 2-D code that encodes the message content, or encodes a link (e.g., a hyperlink) to the message content.

In some other embodiments, the mobile device may send a code-generating request to a code-generating server that generates the 2-D code on behalf of the mobile device. The code-generating server may return the 2-D code to the local mobile device, or in some embodiments, may send the 2-D code to the intended recipient (e.g., to any mobile device being used by the intended recipient).

The mobile device may then allow the user to continue composing or editing his message, and waits to receive a request to send the message (operation 212). If the mobile device (e.g., the messaging application) does not receive the send request, the mobile device may determine whether the user has cancelled the current message or has disabled the messaging application (operation 214).

If the user has not cancelled the message or disabled the messaging application, the system may return to operation 212 to wait for the user to finish composing or editing his message. Otherwise, the process may end, such as to cancel the current message or communication session.

Once the mobile device receives the request to send the message, the mobile device can generate a message that includes at least the two-dimensional code (operation 216), and proceeds to send the message to the target recipient (operation 218). In some embodiments, the message can include the 2-D code, and may also include additional message content that has not been converted into a 2-D code.

Moreover, during operation 218, the mobile device may send the message to a messaging server that makes the message available to the target recipient, or the mobile device may send the message to the target recipient directly (e.g., via a "push" message, or via a peer-to-peer network).

Figure 3A:
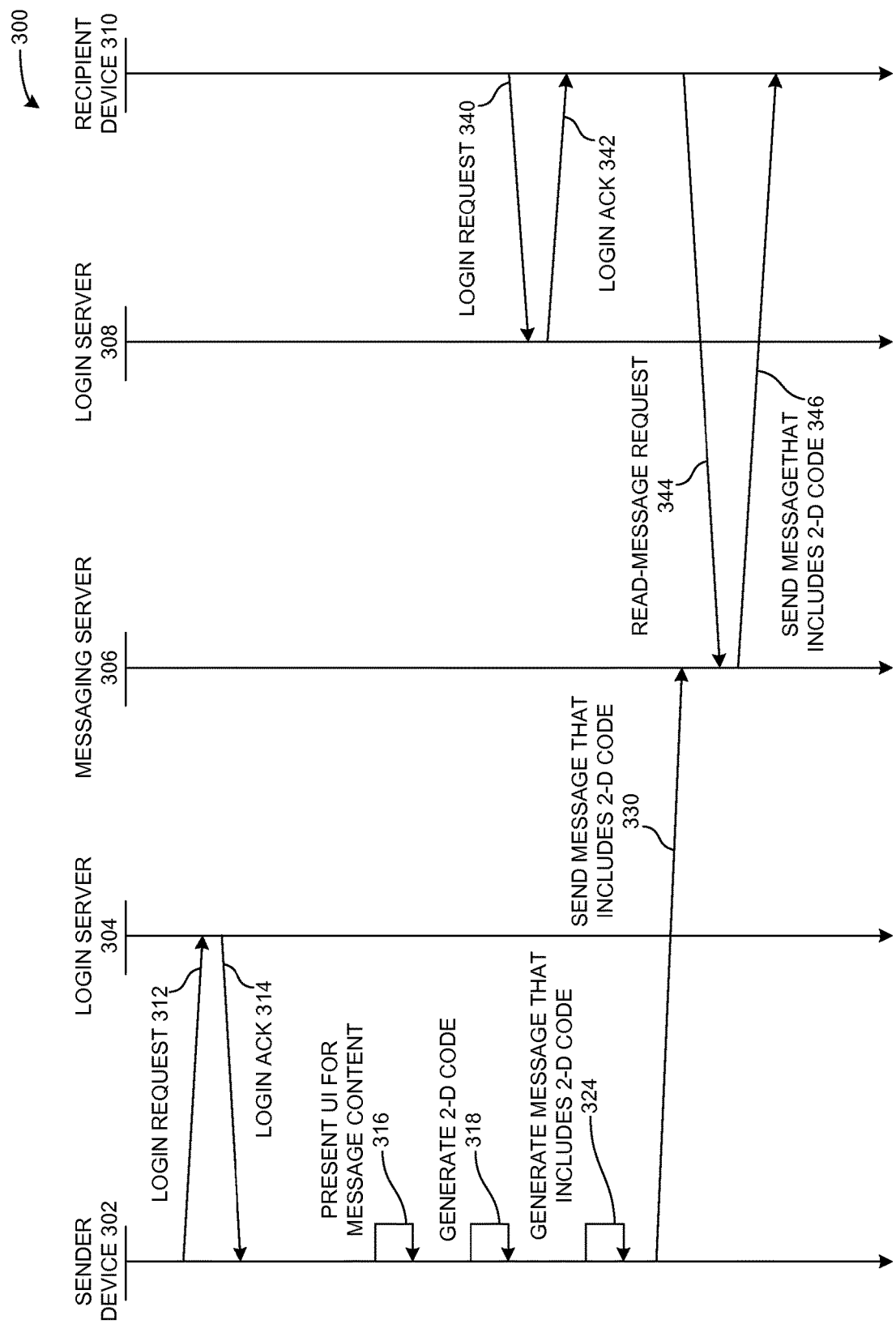
FIG. 3A illustrates exemplary communications over a computer network when generating a two-dimensional code at a sender's device in accordance with an embodiment.

FIG. 3A illustrates exemplary communications 300 over a computer network when generating a two-dimensional code at a sender's mobile device in accordance with an embodiment. When the user activates the messaging application a sender device 302, sender device 302 can send a login request 312 that includes the local user's login credentials to a messaging server 304. If the local user's login credentials are valid, login server 304 may return a login acknowledgement 314 to sender device 302.

Then, if the local user wishes to send a 2-D code to the target recipient, sender device 302 can present the UI mechanism for obtaining the message content to encode (operation 316). Sender device 302 may generate the 2-D code locally (operation 318), and may also generate a message that includes at least the 2-D code (operation 324). Sender device 302 may then send the generated message to a messaging server 306 that can store the message, which allows the target recipient to obtain the message at any time.

To obtain the message that includes the 2-D code, the target recipient may access a messaging application on a recipient device 310, which may require the target recipient to log into the messaging service. Recipient device 310 can send a login request 340 to login server 308, which may or may not be the same server as login server 304.

If the target recipient's login credentials are valid, login server 308 may return a login acknowledgement 342 back to recipient device 310. At this point, recipient device 310 may send a read-message request 344 to messaging server 306 to receive any pending messages. Messaging server 306 may respond by searching for messages intended for the target recipient (e.g., messages which the target recipient has not read), and may send the message that includes the 2-D code to recipient device 310.

Alternatively, in some embodiments, sender device 302 may send the message directly to recipient device 310. This may allow sender device 302 and recipient device 310 to bypass messaging server 306. For example, if sender device 302 and recipient device 310 are communicating with each other in near real-time, sender device 302 can send a message directly to a network address associated with recipient device 310 (e.g., via a "push" message, or over a peer-to-peer network). In this embodiment, sender device 302 and recipient device 310 may not need to first send login requests to login servers 304 and 308, respectively. Rather, sender device 302 and recipient device 310 may authenticate each other directly, such as by exchanging digital certificates or any other type of authentication information now known or later developed.

In some embodiments, when receiving device 310 receives the message originating from sender device 302, recipient device 310 can present the 2-D code within the messaging application. The user may copy the 2-D code into another application on recipient device 310 that may decode the 2-D code.

Alternatively, the messaging application at recipient device 310 may present the 2-D code as an interactive UI element (e.g., a button). The target recipient may select the 2-D code within the UI at recipient device 310 (e.g., by tapping or clicking on the 2-D code within the UI), which can cause recipient device 310 to initiate another application that decodes the 2-D code. Recipient device 310 may present the decoded message content within this other application, or may send the decoded message content back to the messaging application to present the decoded message content inside the messaging application. For example, the other application can include a third-party application, an application supplied along with the operating system, a software extension for the operating system, or the operating system itself.

Figure 3B:
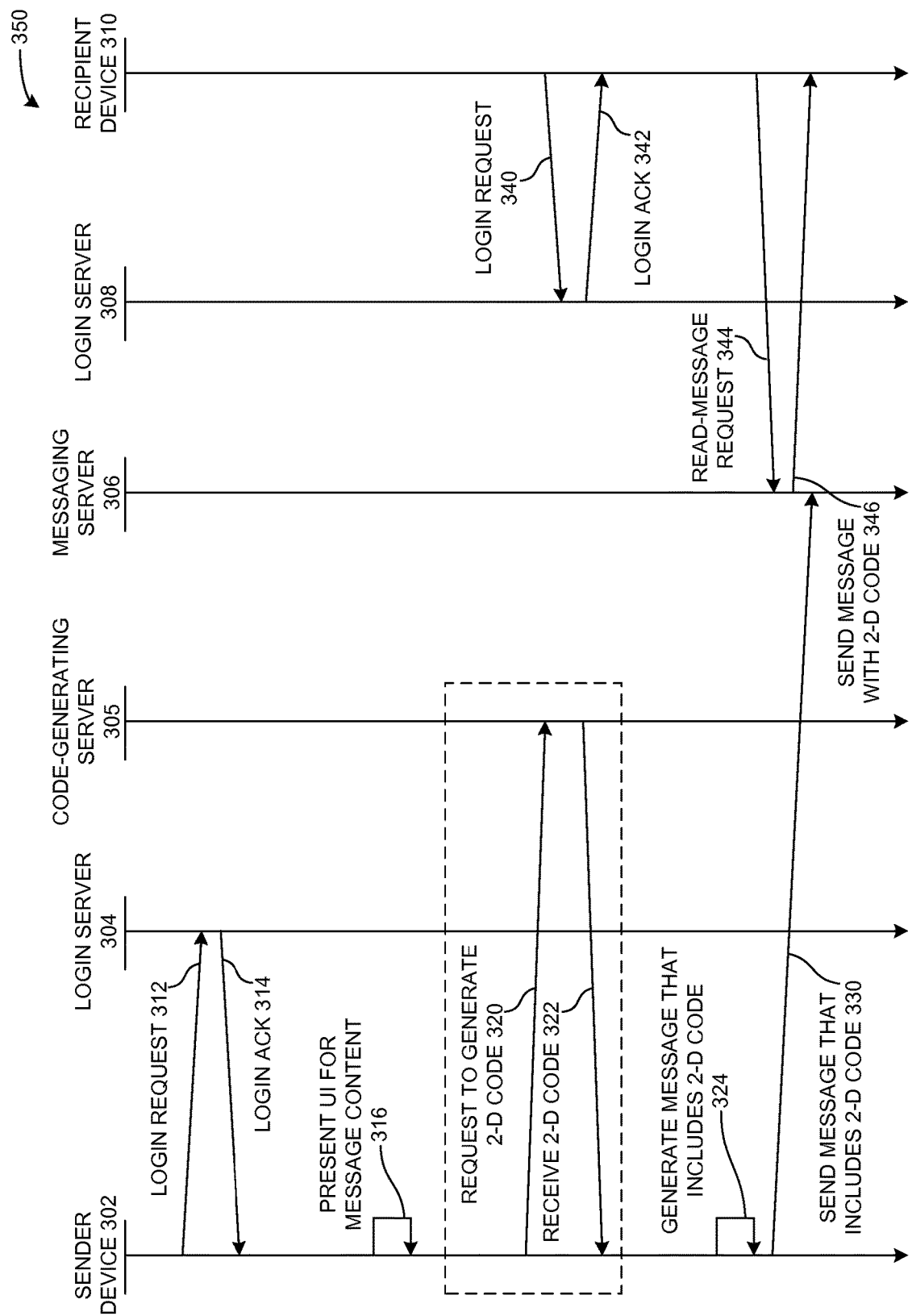
FIG. 3B illustrates exemplary communications over a computer network when generating a two-dimensional code at a code-generating server in accordance with an embodiment.

FIG. 3B illustrates exemplary communications 350 over a computer network when generating a two-dimensional code at a code-generating server 305 in accordance with an embodiment. Specifically, after sender device 302 presents the UI mechanism for obtaining message content to encode (operation 316), sender device 302 can send a request to generate 2-D code to a code-generating server 305 (operation 320). This request can include the message content that the sender wishes to convert into a 2-D message.

Recall that, code-generating server 305 may generate a 2-D code that encodes the message content, or may generate a 2-D code that includes a link (e.g., a hyperlink) to the message content. If the 2-D code include a link, code-generating server 305 may store the original message content either locally or on a third-party storage server (not shown), and generates a link that can be used to obtain the message content. Code-generating server 305 can generate a 2-D code that encodes this link. Then, when recipient device 310 obtains the 2-D code and decodes the link from the 2-D code, recipient device 310 may follow the link to obtain the original message content.

After generating the 2-D code, sender device 302 may receive the 2-D code from code-messaging server (operation 322). Sender device 302 may then proceed to generate the message that includes the 2-D code (operation 324), and to send the message to messaging server 306 (operation 330). However, in some embodiments, sender device 302 may send the 2-D code directly to recipient device 310, thus bypassing messaging server 306.

In some other embodiments, instead of returning the 2-D code back to sender device 302, code-generating server 305 may send the 2-D code to messaging server 306 or to recipient device 310 on behalf of sender 302. This embodiment can simplify the process of sending 2-D codes for the sender, as the sender may not need to go through the extra steps of generating a message that includes the 2-D code (e.g., during operation 324) and sending the message that includes the 2-D code (e.g., during operation 330). If the user wishes to send additional messages that do not include 2-D codes, the user may use the messaging application to send these messages as follow-up messages to the 2-D code.

Figure 4:
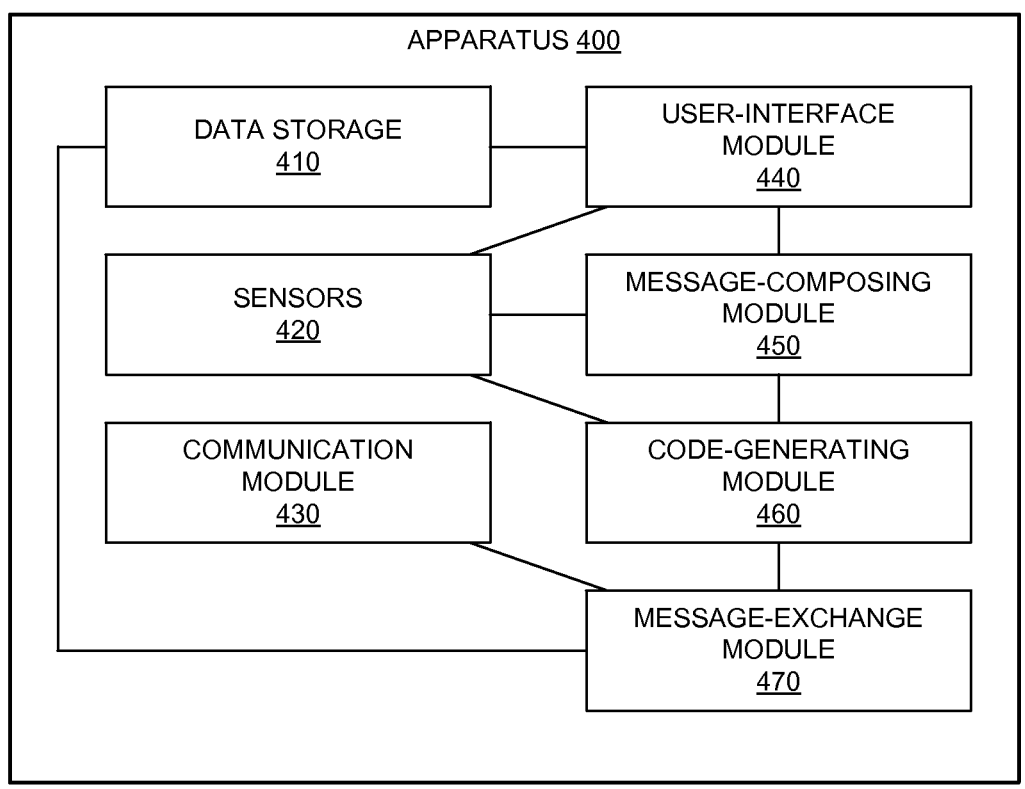
FIG. 4 illustrates an exemplary apparatus that facilitates using a messaging application to generate and send a two-dimensional code to a target recipient in accordance with an embodiment.

FIG. 4 illustrates an exemplary apparatus 400 that facilitates using a messaging application to generate and send a two-dimensional code to a target recipient in accordance with an embodiment. Apparatus 400 can comprise a plurality of modules which may communicate with one another via a wired or wireless communication channel. Apparatus 400 may be realized using one or more integrated circuits, and may include fewer or more modules than those shown in FIG. 4. Further, apparatus 400 may be integrated in a computer system, or realized as a separate device which is capable of communicating with other computer systems and/or devices. Specifically, apparatus 400 can include a data storage module 410, a set of sensors 420, a communication module 430, a user-interface module 440, a message-composing module 450, a code-generating module 460, and a message-exchange module 470.

In some embodiments, data storage module 410 can store any content which has been created or obtained by the local user, and can store one or more messaging applications which the user may use to communicate with others. Sensors 420 can include one or more physical sensors that can allow the user to generate content to share with others, such as an image sensor, a microphone, a camera system, a GPS sensor, a compass, etc. Communication module 430 can include a wired or wireless interface for communicating over a computer network, such as an Internet Packet (IP)-based network, an ad-hoc network (e.g., via Bluetooth or Wi-Fi), etc.

User-interface module 440 can present graphical-control elements on a display screen, and can receive user input from a user. For example, the display screen may include a touch-sensitive (e.g., capacitive touch, or resistive touch) input mechanism, which allows the user to use a finger to perform gestures on the touch-sensitive display screen, which user-interface module 440 interprets into user-input commands.

Message-composing module 402 can allow the local user to compose a message by specifying a target recipient for the message, and to insert text and/or other content into an input field for the message body. Code-generating module 404 can configure user-interface module 440 to display a graphical-control element that allows the user to input or select a piece of content to encode into a 2-D code, and initiates or performs the process of converting the content into the 2-D code. Once the user is finished composing the message, message-exchange module 470 can configure communication module 430 to send the message to the target recipient over a computer network.

Figure 5:
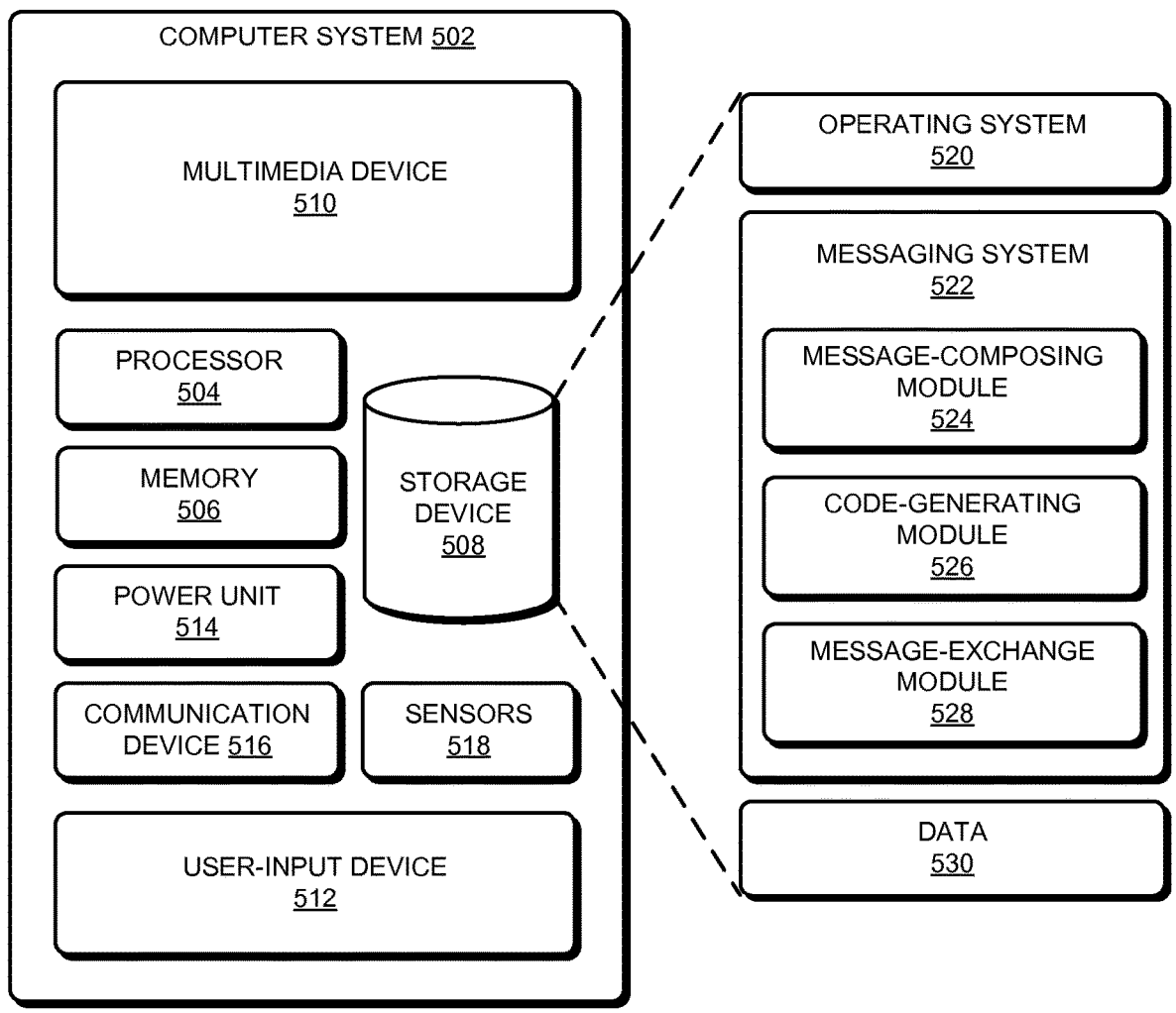
FIG. 5 illustrates an exemplary computer system that facilitates using a messaging application to generate and send a two-dimensional code to a target recipient in accordance with an embodiment.

FIG. 5 illustrates an exemplary computer system 502 that facilitates using a messaging application to generate and send a 2-D code to a target recipient in accordance with an embodiment. Computer system 502 can include a processor 504, a memory 506, and a storage device 508. Memory 506 can include a volatile memory (e.g., RAM) that serves as a managed memory, and can be used to store one or more memory pools. Storage device 508 can include any non-volatile storage medium that can store persistent data, such as a hard drive, a solid-state storage device (e.g., a flash drive), etc. Furthermore, computer system 502 can include or be coupled to a multimedia device 510, a user-input device 512, a power unit 514, a communication mechanism 516, and one or more sensors 518.

Storage device 508 can store operating system 520, a messaging system 522, and data 530. Messaging system 522 can include instructions, which when executed by computer system 502, can cause computer system 502 to perform methods and/or processes described in this disclosure. Specifically, Messaging system 522 may include instructions for allowing the local user to compose a message by specifying a target recipient for the message, and to insert text and/or other content into an input field for the message body (message-composing module 524).

Further, messaging system 522 can include instructions for configuring multimedia device 510 to display a graphical-control element that allows the user to input or select a piece of content to encode into a 2-D code, and for initiating or performing the process of converting the content into the 2-D code (code-generating module 526). Messaging system 522 can also include instructions for configuring communication device 516 to send the message to the target recipient over a computer network (message-exchange module 528).

Data 530 can include any data that is required as input or that is generated as output by the methods and/or processes described in this disclosure. Specifically, data 530 can store at least any content which has been created or obtained by the local user, and can store one or more messaging applications which the user may use to communicate with others. Moreover, data 530 can store data for these applications, such as contact data, phonebook data, messages, pictures, videos, and the like.

In some embodiments, processor 504 may execute the instructions of operating system 520 and messaging system 522 to control overall operations of computer system 502, such as the operations associated with presenting information on multimedia device 510, initiating and managing telephone calls, managing messages (e.g., composing, sending, and/or receiving messages), communicating data over a network, camera operations, and recording operations. Processor 504 may comprise one or more processing units to execute local or remote instructions to perform all or a part of the steps in the above-described methods. In addition, processor 504 may comprise one or more hardware modules, and may execute one or more software modules, which facilitate the interaction between processor 504 and other components of computer system 502. For example, processor 504 may comprise a multimedia module that manages an interface between processor 504 and multimedia device 510.

Power unit 514 can provide power to various components of computer system 502. For example, power unit 514 can include a power management system, one or more power supplies, a battery, and other components associated with the generation, management, and distribution of power in the mobile computer system 502.

Multimedia device 510 can include a screen providing an output interface between computer system 502 and the user. In some embodiments, the screen may include a liquid crystal display (LCD). Multimedia device 510 may also include an audio component (e.g., at least one speaker) to output audio signals.

User-input device 512 can also include one or more interface devices included in or coupled to computer system 502, such as a keyboard, a mouse, a click wheel, a button, or the like. The buttons may include, but are not limited to, a home button, a volume button, a starting button, a locking button, a power or standby button, or a mouse button.

Moreover, in some embodiments, multimedia device 510 may include user-input device 512. For example, multimedia deice 510 may include a touch panel (TP) on an LCD screen to receive input signals from the user. The touch panel can include one or more touch sensors to sense touch gestures, multi-finger touch gestures, swipe gestures, and/or any other gestures on the touch panel. The touch sensors may not only sense a boundary of a touch or swipe gesture, but may also sense a period of time and a pressure associated with the touch or swipe gesture.

Sensors 518 can include one or more sensors that a local user can use to generate content to encode into a 2-D code. For example, sensors 518 can include a microphone and one or more image sensors (e.g., a CMOS or CCD image sensor), such as a front-facing camera and/or a rear-facing camera. The front-facing camera and/or the rear-facing camera may receive external multimedia data while computer system 502 is in an operation mode, such as a photographing mode or a video mode. These cameras may include a fixed optical lens system, or may include focus and optical zoom capability. Moreover, the microphone can be configured to receive an external audio signal when mobile computer system 502 is in certain operating modes, such as a recording mode, a voice recognition mode, or a call mode. Computer system 502 can store the sensor data in storage device 508, can generate a 2-D code that includes the sensor data (or a link to the sensor data), and/or can transmit the 2-D code via communication device 516.

In some embodiments, sensors 518 can include an accelerometer or motion sensor, a gyroscope sensor, a magnetic sensor, a pressure sensor, a temperature sensor, or a proximity sensor. For example, computer system 502 can capture and process measurements from accelerometers or motion sensors to detect location coordinates for computer system 502, to detect a change in position of computer system 502 or a component of computer system 502, and/or to detect an orientation or an acceleration/deceleration of computer system 502. Moreover, computer system 502 can capture and process measurements from one or more proximity sensors to detect a presence or absence of user contact with computer system 502, and/or to detect the presence of nearby objects without any physical contact with these objects.

Computer system 502 can use measurements from the pressure sensor to detect, for example, an open or closed status of computer system 502 (e.g., a laptop). Moreover, computer system 502 can use measurements from one or more temperature sensors to detect a change in temperature of computer system 502, one or more components of computer system 502, and/or an ambient temperature surrounding computer system 502.

Communication device 516 can be configured to facilitate communications, wired or wirelessly over an ad-hoc or IP-based network, between computer system 502 and other devices. For example, communication device 516 can include a radio that may access a wireless network based on a communication standard, such as Wi-Fi, 2G, or 3G, 4G, any communication standard now known or later developed, or a combination thereof.

In one exemplary embodiment, communication device 516 may receive a broadcast signal or broadcast associated information from an external broadcast management system via a broadcast channel. In one exemplary embodiment, communication device 516 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
    determining, by a computing device presenting a messaging application to a first user, that the messaging application does not support sending a piece of content, wherein the messaging application facilitates bidirectional message-based communication between the first user and a second user, and wherein content of the communication is provided by the first and second users;
    obtaining a request to generate a two-dimensional code for sending the piece of content;
    presenting, within the messaging application, a user-interface for converting the piece of content into the two-dimensional code;
    generating, using the messaging application, the two-dimensional code representing the corresponding piece of content;
    generating, for the second user, a message comprising the two-dimensional code within the messaging application; and
    transmitting the message via the messaging application.

2. The method of claim 1, wherein the user-interface comprises an input field of the messaging application, and wherein the input field is configured to obtain the piece of content from the first user.

3. The method of claim 1, wherein generating the message further involves:
    obtaining, from the first user, an additional piece of content that is not to be converted to the two-dimensional code; and
    including, in the message, the additional piece of content.

4. The method of claim 1, further comprising determining whether a user has canceled the request at the user-interface.

5. The method of claim 1, wherein presenting the user-interface within the messaging application involves presenting the user-interface as an overlay interface on top of the messaging application.

6. The method of claim 1, wherein generating the two-dimensional code involves processing the piece of content using a code-generating application on the computing device.

7. The method of claim 1, wherein generating the two-dimensional code involves sending the piece of content to a code-generating server.

8. The method of claim 1, wherein transmitting the message via the messaging application involves sending the message to a messaging server.

9. The method of claim 1, wherein transmitting the message via the messaging application involves sending the message to a second computing device presenting the messaging application to the second user.

10. The method of claim 1, wherein the two-dimensional code comprises a hyperlink to the piece of content.

11. A non-transitory computer-readable storage medium storing instructions that when executed by a computer cause the computer to perform a method, the method comprising:
    determining that a messaging application does not support sending a piece of content, wherein the messaging application facilitates bidirectional message-based communication between a first user and a second user, and wherein content of the communication is provided by the first and second users;
    obtaining a request to generate a two-dimensional code for sending the piece of content;
    presenting, within the messaging application, a user-interface for converting the piece of content into the two-dimensional code;
    generating, using the messaging application, the two-dimensional code representing the corresponding piece of content;
    generating, for the second user, a message comprising the two-dimensional code within the messaging application; and
    transmitting the message via the messaging application.

12. The storage medium of claim 11, wherein the user-interface comprises an input field of the messaging application, and wherein the input field is configured to obtain the piece of content from the first user.

13. The storage medium of claim 11, wherein generating the message further involves:
    obtaining, from the first user, an additional piece of content that is not to be converted to the two-dimensional code; and
    including, in the message, the additional piece of content.

14. The storage medium of claim 11, wherein generating the two-dimensional code involves one or more of:
    processing the piece of content using a code-generating application on the computer; and
    sending the piece of content to a code-generating server.

15. The storage medium of claim 11, wherein transmitting the message via the messaging application involves one or more of:
    sending the message to a messaging server; and
    sending the message to a second computing device presenting the messaging application to the second user.

16. An apparatus, comprising:
    a processor; and
    a memory coupled to the processor and storing instructions, which when executed by the processor cause the processor to perform a method, the method comprising:
        determining that a messaging application of the apparatus does not support sending a piece of content, wherein the messaging application facilitates bidirectional message-based communication between a first user and a second user, and wherein content of the communication is provided by the first and second users;
        obtaining, via the messaging application, a request to generate a two-dimensional code for sending the piece of content;
        presenting, within the messaging application, a user-interface for converting the piece of content into the two-dimensional code;
        generating, using the messaging application, the two-dimensional code representing the corresponding piece of content;
        generating, for the second user, a message comprising the two-dimensional code within the messaging application; and
        transmitting the message via the messaging application.

17. The apparatus of claim 16, wherein the method further comprises facilitating an input field of the messaging application in the user-interface, and wherein the input field is configured to obtain the piece of content from the first user.

18. The apparatus of claim 16, wherein the method further comprises:
  obtaining, from the first user, an additional piece of content that is not to be converted to the two-dimensional code; and
  including, in the message, the additional piece of content.

19. The apparatus of claim 16, wherein generating the two-dimensional code involves one or more of:
  processing the piece of content using a local code-generating module; and
  sending the piece of content to a code-generating server.

20. The apparatus of claim 16, wherein transmitting the message via the messaging application involves one or more of:
  sending the message to a messaging server; and
  sending the message to a second computing device presenting the messaging application to the second user.

* * * * *